US005130586A

United States Patent [19]

Miyaji et al.

[11] Patent Number: 5,130,586

[45] Date of Patent: Jul. 14, 1992

[54] INTERMEDIATE GEAR TYPE STARTER MOTOR

[75] Inventors: Wakaki Miyaji; Yoshiaki Kittaka, both of Himeji, Japan

[73] Assignee: Mitsubishi Denki K.K., Tokyo, Japan

[21] Appl. No.: 711,685

[22] Filed: Jun. 7, 1991

[30] Foreign Application Priority Data

Jun. 8, 1990 [JP] Japan .......... 2-60903[U]
Jun. 8, 1990 [JP] Japan .......... 2-151413

[51] Int. Cl.[5] .......... H02K 7/06; F02N 0/00

[52] U.S. Cl. .......... 310/83; 74/7 E; 74/7 R

[58] Field of Search .......... 310/83, 99, 100, 78; 74/6, 8, 7 R, 7 A, 7 E, 7 C

[56] References Cited

U.S. PATENT DOCUMENTS

| | | | |
|---|---|---|---|
| 4,295,069 | 10/1981 | Givan et al. | 310/67 R |
| 4,860,604 | 8/1989 | Kinoshita | 74/7 E |
| 4,868,442 | 9/1989 | Isozumi et al. | 310/239 |
| 4,881,416 | 11/1989 | Isozumi | 74/7 A |
| 4,902,904 | 2/1990 | Isozumi | 290/48 |
| 4,958,530 | 9/1990 | Jaseck et al. | 74/7 A |
| 4,974,463 | 12/1990 | Luiki | 74/7 A |
| 5,014,562 | 5/1991 | Sugiyama et al. | 74/6 |

FOREIGN PATENT DOCUMENTS

| | | | |
|---|---|---|---|
| 2196163 | 8/1990 | Japan | 74/7 A |

*Primary Examiner*—Steven L. Stephan
*Assistant Examiner*—Matthew Nguyen
*Attorney, Agent, or Firm*—Sughrue, Mion, Zinn, Macpeak & Seas

[57] ABSTRACT

An intermediate gear type starter motor of the present invention comprises an electric motor with an armature rotary shaft, an overrunning clutch to which rotation of the rotary shaft is transmitted directly or through a speed reducing mechanism, an intermediate gear and a shift coupler. The overrunning clutch rotating a pinion in one way is provided at the front end of the overrunning clutch and is moved axially by a shift lever which is operated by an electromagnetic switch. The intermediate gear is rotatably and axially movably mounted on a supporting shaft arranged in parallel with the axis of the rotary shaft. The intermediate gear is in engagement with the pinion and is moved forwardly to engage with the ring gear of an internal combustion engine. The shift coupler of the present invention includes an annular portion which is loosely mounted on the rear end portion of the clutch outer of the overrunning clutch in such a manner that the axial movement thereof is limited, and an engaging portion extended radially of the annular portion. The engaging portion is engaged with the boss of the intermediate gear at least a half of the outer periphery thereof and limited in axial movement. When the swing of the shift lever is transmitted axially to the annular portion or the boss of the intermediate gear, the overrunning clutch and the intermediate gear are moved axially being operated through the shift coupler. Therefore, the smooth axial movement of the intermediate gear can be achieved.

10 Claims, 7 Drawing Sheets

INTERMEDIATE GEAR TYPE STARTER MOTOR

BACKGROUND OF THE INVENTION

1. Field of the Industrial Application

This invention relates to a starter motor with an intermediate gear (hereinafter referred to as "an intermediate gear type starter motor", when applicable) the rotation of which is transmitted through the overrunning clutch and the intermediate gear to the ring gear of an engine, thereby to start the latter.

2. Description of the Prior Art

FIG. 1 is a sectional view showing essential components of a conventional intermediate gear type starter motor which has been disclosed, for instance, by Japanese Utility Model Application (OPI) No. 84369/1983 (the term "OPI" as used herein means an "unexamined published application"). In FIG. 1, reference numeral 1 designates a DC motor, in which an armature rotary shaft 3 is extended forwardly (to the right in FIG. 1) from its armature 2; and 5, a front bracket to which the DC motor 1 is coupled, the front bracket 5 supporting the front end portion of the rotary shaft 3 through a sleeve bearing 6.

Further in FIG. 1, reference numeral 7 designates an overrunning clutch which is slidably mounted on the rotary shaft 3. The overrunning clutch 7 is designed as follows: Reference numeral 8 designates a clutch outer which is engaged with the helical spline gear 4 formed on the rotary shaft 3 so as to be rotated thereby. Reference numeral 9 designates a clutch inner which transmits rotation through rollers 10 to the clutch outer 8 in one way. The clutch inner 9 is mounted on the rotary shaft 3 through a sleeve bearing 17. A pinion 11 is formed in the front end portion, of the clutch inner 9. Reference numeral 12 designates a clutch cover which is secured through a stiffening plate 12 to the clutch outer 8 by staking; 14, a locking ring secured to the clutch outer 8, thus defining an engaging groove 15 with a step of the clutch outer 8; and 16, an eccentricity regulating ring secured to the inner cylindrical wall of the clutch outer.

Further in FIG. 1, reference numeral 20 designates a shift lever which has a forked end portion engaged with the engaging groove 15, and an fulcrum portion at the middle which is supported by a supporting plate 21. The supporting plate 21 is supported through a cushioning spring 23 on a grommet 22 secured to the yoke of the motor 1. The other end portion of the shift lever 20 is coupled to the end portion of the plunger (not shown) of an electromagnetic switch mounted on the motor 1, so that the shift lever 20 is turned about its fulcrum portion.

Reference numeral 24 denotes a supporting shaft fixedly secured to the front bracket 5 in such a manner that shaft 24 is in parallel with the rotary shaft 3; 26, designates an intermediate gear mounted on the supporting shaft 24 through a sleeve bearing 28 secured to the inner cylindrical wall of the intermediate gear, the intermediate gear 26 having a boss 26*a* in the outer cylindrical wall of which an annular groove 27 is formed; and 29, a shift ring secured to the outer cylindrical wall of the clutch cover 12. The shift ring 29 has an annular protrusion (flange) 29*a* radially extended, which is engaged with the annular groove 27.

The annular protrusion 29*a* of the shift ring 29 is engaged with the annular groove 27 of the intermediate gear 26 as shown in FIG. 2.

The operation of the conventional starter motor thus constructed will be described.

When the exciting coil of the electromagnetic switch (not shown) is energized, the plunger is attracted so as to turn the shift lever 20 counterclockwise. As a result, the overrunning clutch 7 is moved forwardly (in the direction of the arrow A) until it strikes against a stopper 18 provided on the rotary shaft. As the overrunning clutch 7 is moved in this way, the intermediate gear 26 is moved on the supporting shaft 24 with the aid of the shift ring 29, thus engaging with the ring gear 30 of the internal combustion engine. Thereafter, the stationary contact means in the electromagnetic switch is closed, so that current flows in the circuit of the DC motor, whereby the armature 2 is rotated, and the rotation of the rotary shaft 3 is transmitted through the overrunning clutch 7, the pinion 11 and the intermediate gear 16 to the ring gear of the internal combustion engine, to start the latter.

In the conventional starter motor described above, the engagement, in the axial direction, of the annular protrusion 29*a* of the shift ring 29 with the annular groove 27 of the intermediate gear 26 is limited in width; that is, the engagement is effected only in the upper portion of the annular groove 27. Hence, when the overrunning clutch is moved, the moment acts on the intermediate gear, thus obstructing the smooth axial movement of the intermediate gear. Furthermore, since the engagement area of the annular protrusion 29*a* and the annular groove 27 is small, the force of movement is not positively transmitted, and therefore the annular protrusion 29*a* and the annular groove 27 are liable to be worn greatly, thus shortening the service life.

SUMMARY OF THE INVENTION

Accordingly, an object of the invention is to eliminate the above-described difficulties accompanying a conventional intermediate gear type starter motor. More specifically, an object of the invention is to provide an intermediate gear type starter motor in which the intermediate gear can be smoothly o moved in the direction of axis, and the engaging portions of the shift coupler and the intermediate gear are reduced in the amount of wear, whereby not only the service life but also the reliability is improved. Further, an object of the invention is to provide an intermediate gear type starter motor in which the overrunning clutch can be used without welding it to a certain component, the axial movement of the intermediate gear is smooth, and after the starter motor has been assembled, the intermediate gear assembly can be readily combined therewith.

In an intermediate gear type starter motor according to the invention, a shift coupler is interposed between the clutch outer of the overrunning clutch and the boss of the intermediate gear to achieve the axial movement of the overrunning clutch and the intermediate gear in an interlock mode. The shift coupler is designed as follows:

In an intermediate gear type starter motor according to a first aspect of the present invention, the shift coupler has an annular portion which is loosely mounted on the rear end portion of the clutch outer in such a manner that its axial movement is limited. The shift coupler further has an engaging portion which is extended radially of the annular portion. The engaging portion is engaged with the boss of the intermediate gear at least a half of the outer periphery thereof and limited in axial movement. The end portions of the two prongs of the shift lever are engaged with the annular portion or the boss of the intermediate gear axially so as to apply the force of movement thereto.

In the intermediate gear type starter motor according to a second aspect of the present invention, the shift coupler is formed by stamping a metal plate.

In the intermediate gear type starter motor according to a third aspect of the present invention, the shift coupler is made up of an annular member and an engaging member which are separately provided. The annular member is loosely mounted on the rear end portion of the clutch outer with the axial movement thereof limited. The annular member has engaging means through which the annular member is engaged with the end portions of two prongs of the shift lever so that it is moved by the shift lever. The engaging member is loosely mounted on the rear end portion of the clutch outer in such a manner that the engaging member is located between the annular member and the step of the rear end portion of the clutch outer, thus being limited in axial movement. The engaging member includes an engaging portion extended radially which is engaged with at least a half of an annular groove formed in the outer cylindrical surface of the boss of the intermediate gear with the axial movement limited.

In the intermediate gear type starter motor according to a fourth aspect of the present invention, the shift coupler comprises an annular member and an engaging member which are provided separately. The annular member is loosely mounted on the rear end portion of the clutch outer with the axial movement limited. The annular member is engaged with the end portions of the two prongs of the shift lever through engaging means so that it is moved by the shift lever. The annular member has a coupling portion extended radially and has an arcuate engaging groove coaxial with the intermediate gear. The engaging member is in the form of a disk which is secured to the boss of the intermediate gear, in such a manner that its outer peripheral portion is engaged with the engaging groove with the axial movement limited.

In an intermediate gear type starter motor according to a fifth aspect of the invention, the boss of a shift coupler is mounted on the boss of the intermediate gear in such a manner it is movable circumferentially but not movable axially, and the rear end portion of an arm extended from the boss of the shift coupler is formed into an arcuate engaging portion. The arcuate engaging portion is inserted into an engaging groove formed in the overrunning clutch with the axial movement limited.

In the intermediate gear type starter motor according to the first aspect of the present invention, the engaging portion extended from the annular portion is engaged with the boss of the intermediate gear at least a half of the outer periphery thereof with the axial movement limited. Hence, the intermediate gear can be moved smoothly, and the area of engagement of the engaging portion and the intermediate gear is increased, whereby the amount of wear is decreased, and the service life is increased accordingly.

In the intermediate gear type starter motor according to the second aspect of the present invention, the shift coupler is formed by stamping a metal plate; that is, it can be manufactured with ease. In engaging the engaging portion with the annular groove formed in the boss of the intermediate gear, the engaging portion is increased in inside diameter by bending its inner peripheral portion, and the engaging portion thus treated is engaged with the annular groove by restoring the inside diameter. Therefore, the axial movement of the engaging portion can be limited without use of a retaining ring.

In the intermediate gear type starter motor according to the third aspect of the present invention, the engaging portion is extended from the engaging member which is fitted between the annular member mounted on the rear end portion of the clutch outer and the step of the latter, and the engaging portion thus extended is engaged with the annular groove formed in the boss of the intermediate gear. In this case also, the axial movement of the engaging member is limited merely by inserting it into the annular groove; that is, it is unnecessary to use a retaining ring etc.

In the intermediate gear type starter motor according to the fourth aspect of the present invention, the engaging groove is formed in the coupling portion extended from the annular member which is mounted on the rear end portion of the clutch outer, and the disk-shaped engaging member mounted on the boss of the intermediate gear is engaged with the engaging groove with its axial movement limited. Hence, the shift coupler is simple in construction, and the intermediate gear can be moved smoothly.

In the intermediate gear type starter motor according to the fifth aspect of the present invention, the boss of the shift coupler is mounted on the boss of the intermediate gear in such a manner as to surround the whole outer cylindrical surface of the boss of the intermediate gear, and the smooth axial movement of the intermediate gear is permitted. The shift coupler is engaged with the engaging groove of the overrunning clutch through its arcuate engaging portion, thus providing a large engaging area. Therefore, the shift coupler can achieve its moving and coupling operation with high reliability. With the overrunning clutch set at the forward position, the intermediate gear assembly can be built in the start motor in the final step of the assembling work with ease.

DETAILED DESCRIPTION OF THE PREFERRED EMBODIMENT

A preferred embodiments of the present invention will now be described with reference to the drawings.

Figure 1:
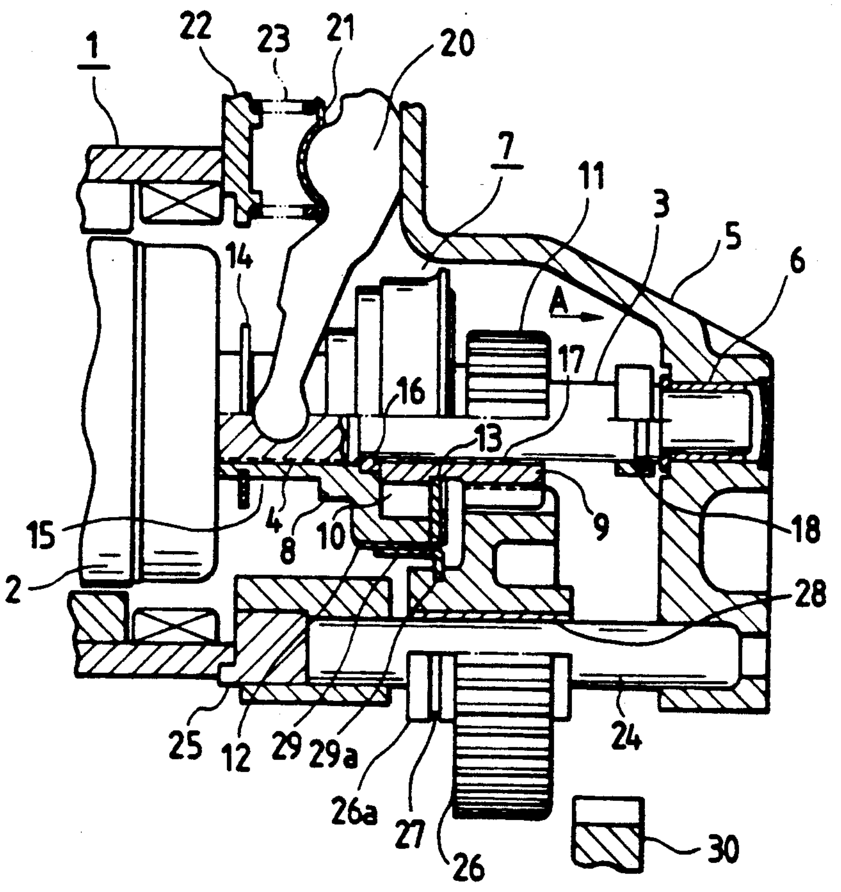
FIG. 1 (Prior Art)
FIG. 1 is a front view, with parts cut away, showing essential components in a part of a conventional intermediate gear type starter motor.
Figure 2:
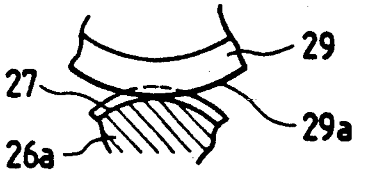
FIG. 2 (Prior Art)
FIG. 2 is a side view showing the engagement of a shift ring with an intermediate gear in FIG. 1.
Figure 3:
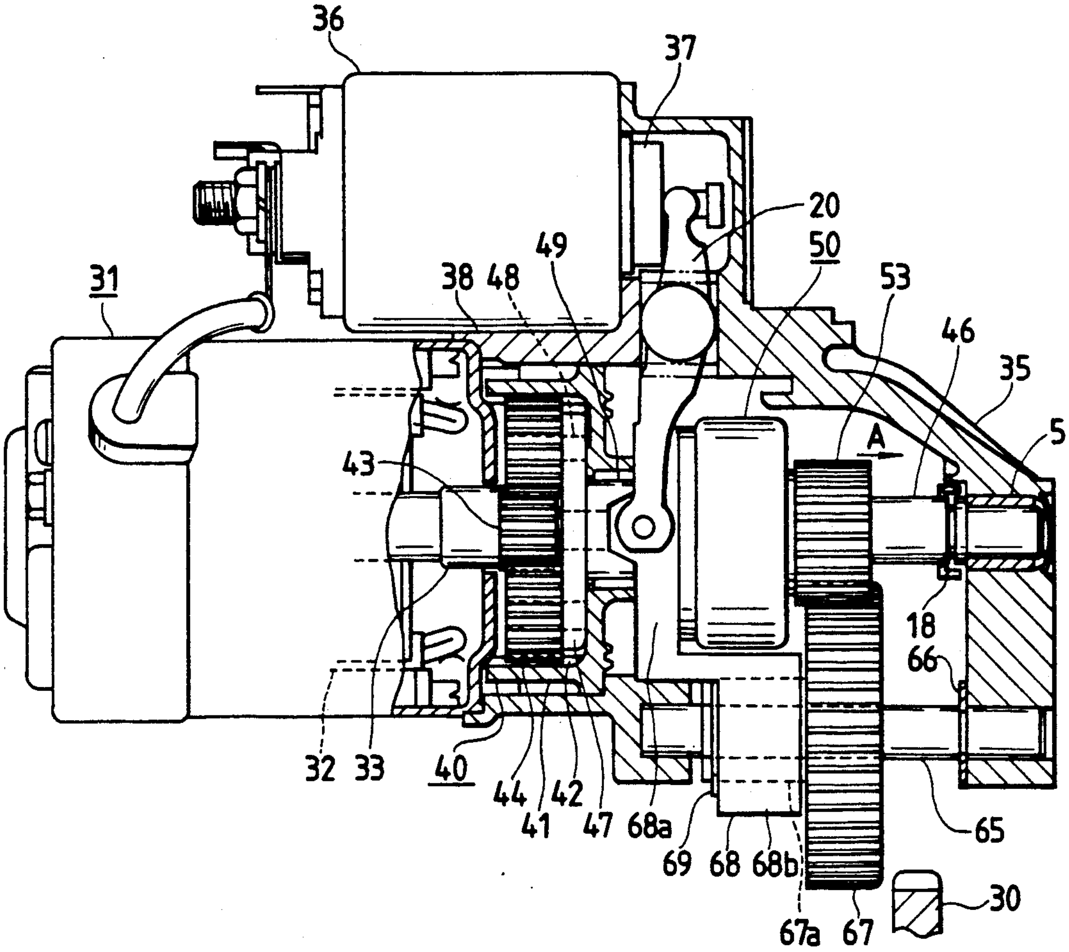
FIG. 3 is a front view, with parts cut away, showing essential components of an intermediate gear type starter motor which constitutes a first embodiment of this invention.

FIG. 3 is a front view, partly as a sectional view, showing essential components of an intermediate type starter motor which constitutes a first embodiment of this invention. In the case of FIG. 3, an overrunning clutch is coupled to a DC motor through a planetary gear type speed reducer. In FIG. 3, reference numeral 31 designates a DC motor in which an armature rotary shaft 33 is extended from its armature 32. The front end portion of the rotary shaft 33 is formed into a sun gear 43 which is a pinion. Reference numeral 35 designates a front bracket which is coupled to the yoke of the DC motor 31.

A reference numeral 36 designates an electromagnetic switch 36 mounted on the front bracket 35. The electromagnetic switch 36 has a plunger 37 whose front end portion is coupled to one end portion of a shift lever 20, so that the latter 20 is turned about its fulcrum portion located at the middle. Reference numeral 38 designates a grommet of rubber which is fitted in the front bracket 35 to support the fulcrum portion of the shift lever 20.

Reference numeral 40 designates a planetary gear type speed reducer which is designed as follows: Reference numeral 41 designates an internal gear frame secured fixedly to the front bracket 35. An internal gear 42 is formed in the inner cylindrical wall of the internal gear frame 41. Planetary gears 44 are mounted on support pins 48 through bearings (not shown) which pins are fixedly embedded in a flange 47 formed on a relay shaft 46. Hence, the relay shaft 46 is rotated at lower speed as the planetary gears 44 revolve.

The rear end portion of the relay shaft 46 is supported through a bearing 49 by the internal gear frame 41, while the front end portion is supported through a sleeve bearing 5 by the front bracket 35. A helical spline gear **46*a* is formed in the middle portion of the relay shaft 46 as shown in FIG. 4**.

Further in FIG. 3, reference numeral 50 designates an overrunning clutch mounted on the relay shaft 46. The over running clutch 50 is designed as shown in FIG. 4. In FIG. 4, reference numeral 51 designates a clutch outer which is engaged with the helical spline gear 46 of the relay shaft 46 so that the speed-reduced rotation of the latter 46 is transmitted to the clutch outer 51; and 52, a clutch inner which transmits rotation through rollers 10 to the clutch outer 51 in one way. The clutch inner 52 is mounted on the relay shaft 46 through a sleeve bearing 17 in such a manner that it is movable in an axial direction. The front end portion of the clutch inner 52 is formed into a pinion 53, which can be moved forwardly until it is detained by a stopper 18. A clutch cover 12 is fixedly secured to the clutch outer 51 through a stiffening plate 13 by staking.

Figure 4:
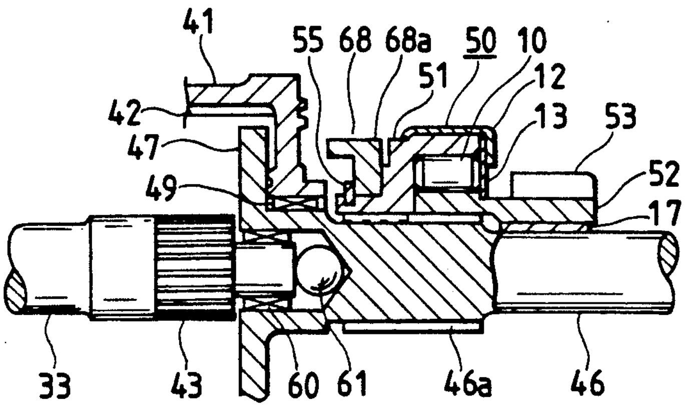
FIG. 4 is a sectional view showing a shift coupler engaged with a clutch outer in FIG. 3.

As shown in FIG. 4, the front end portion of the armature rotary shaft 33 is rotatably held through a bearing 60 in a supporting hole formed in the rear end portion of the relay shaft 46, with a steel ball 61 held between the front end face of the armature rotary shaft 33 and the bottom of the supporting hole.

Referring back to FIG. 3, reference numeral 65 designates a supporting shaft secured to the front bracket 35 in such a manner that it is in parallel with the relay shaft 46, the supporting shaft 65 having a retaining ring 66 so that it may not come off the bracket; 67, an intermediate gear which is rotatably and slidably mounted on the supporting shaft 65 through a sleeve bearing (not shown) secured to the inner cylindrical wall thereof. The rotation is transmitted to the intermediate gear through the pinion 53. Reference numeral 68 designates a shift coupler interposed between the clutch outer 51 and the boss **67*a* of the intermediate gear 67. The shift coupler 68 is made of a synthetic resin material high in mechanical strength. The shift coupler 68 has an annular portion 68*a* which is loosely mounted on the rear end portion of the clutch outer 51 so as to allow the latter 51 to freely rotate. As shown in FIG. 4, a retaining ring 55 is mounted on the rear end portion of the clutch outer so that the shift coupler is engaged with the clutch outer in the direction of axis. As shown in FIG. 3, an engaging portion 68*b*, which is radially extended from the annular portion 68*a*, is loosely mounted on the boss 67*a* of the intermediate gear 67 in such a manner that it will not disturb the rotation of the intermediate gear 67. However, it should be noted that the engaging portion 68*b*** is engaged with the intermediate gear in the direction of axis.

Figure 5:
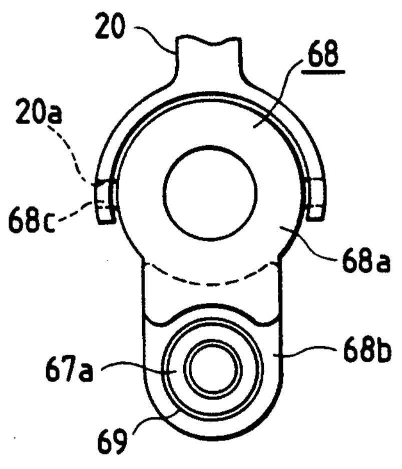
FIG. 5 is a side view of the shift coupler shown in FIG. 3.

As shown in FIG. 5, a pair of protrusions **68*c* extended from the outer cylindrical surface of the annular portion 68*a* are engaged with engaging holes 20*a* formed in the end portions of the two prongs of the shift lever 20**.

When the shift lever 20 is turned, the overrunning clutch 50 is moved in the direction of axis with the aid of the shift coupler 68, and simultaneously the intermediate gear 67 is moved. In this case, since the engaging portion 68*b* of the shift coupler 68 is engaged with the boss 67*a* of the intermediate gear 67, no moment acts on the intermediate gear 67, and accordingly the latter 67 is moved smoothly.

When the electromagnetic switch 36 is energized, the shift lever 20 is turned counterclockwise, so that the overrunning clutch 50 and the intermediate gear 67 are moved forwardly (in the direction of the arrow A) through the shift coupler 68; that is, the intermediate gear 57 is engaged with the ring gear 30 of the engine. At the same time, the stationary contact means of the electromagnetic switch is closed to energize the circuit of the starter motor 31 thereby to rotate the armature 32. The rotation of the armature 32 is transmitted to the relay shaft 46 with the speed reduced by the planetary gear type speed reducer 40, so that the ring gear 30 is rotated through the overrunning clutch 50 and the intermediate gear 67, thus starting the internal combustion engine.

Figure 6:
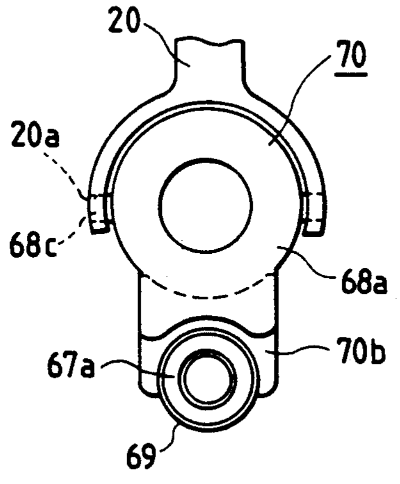
FIG. 6 is a side view of a shift coupler in a second embodiment of the invention.

FIG. 6 is a side view of a shift coupler 70 in a second embodiment of the invention. The shift coupler 70 is different from the above-described shift coupler 68 shown in FIG. 5 only in its engaging portion 70*b*. That is, the engaging portion 70*b* is engaged with the boss 67*a* of the intermediate gear 67 in such a manner that it covers half of the outer cylindrical surface of the boss 67*a*, allowing the rotation of the latter 67*a*. A retaining ring 69 is mounted on the boss to limit the axial movement of the engaging portion 70*b*. Alternatively, an annular groove may be formed in the boss 67*b* so that the engaging portion 70*b* is engaged with the boss through the annular groove thus formed.

The above-described structure facilitates the assembling of the engaging portion 78*b* of the shift coupler 70 and the boss 67, and prevents the difficulty that the intermediate gear is free from moment when moved in the axial direction.

Figure 7:
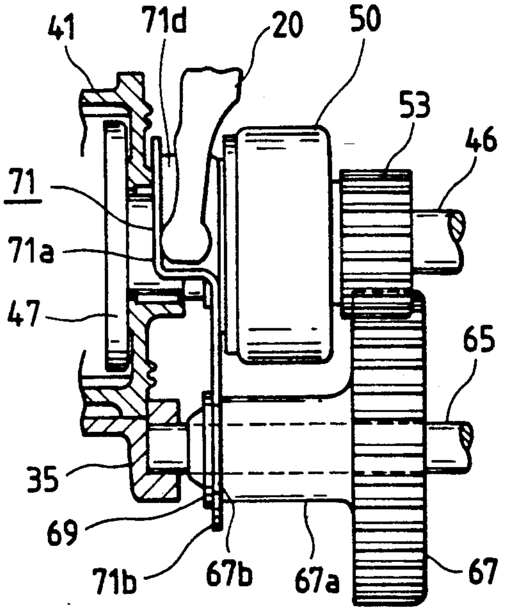
FIG. 7 is a front view, with parts cut away, showing the coupling of an overrunning clutch to an intermediate gear through a shift coupler in a third embodiment of the invention.

FIG. 7 is a front view, with parts of the overrunning clutch and the intermediate gear in section, of a shift coupler in a third embodiment of the invention. In the third embodiment, the shift coupler 71 is interposed between the overrunning clutch 50 and the intermediate gear 67.

Figure 8:
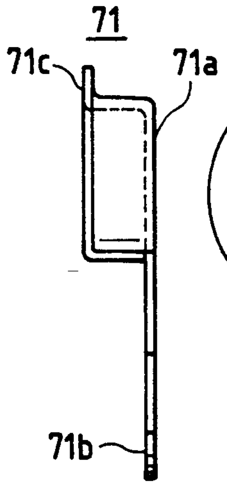
FIGS. 8 and 9 are a front view and a side view of the shift coupler shown in FIG. 7.
Figure 9:
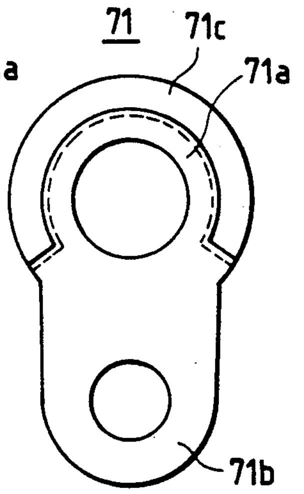

As shown in FIGS. 8 and 9, the shift coupler 71 is formed by stamping metal plate in such manner it comprises an annular portion 71*a* and an engaging portion 71*b* extended radially of the annular portion 71*a*. The annular portion 71*a* includes a flange 71*c*.

Figure 10:
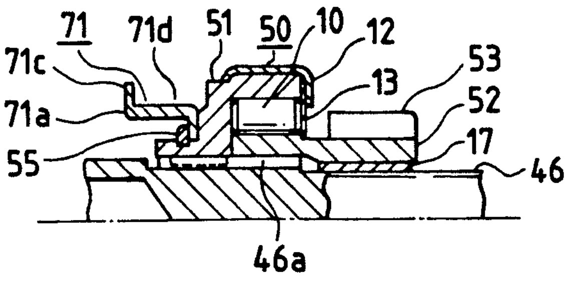
FIG. 10 is a sectional view showing the engagement of the shift coupler with an clutch outer.

As shown in FIG. 10, the annular portion 71*a* of the shift coupler 71 is loosely mounted on the rear end portion of the clutch outer 51, allowing the rotation of the clutch outer. The axial movement of the annular portion 71*a* is limited by a retaining ring 55 mounted on the rear end portion of the clutch outer 51. The flange 71*c* of the annular portion 71*a*, and the step of the clutch outer 51 form an engaging groove 71*d* with which the end portions of the two prongs of the shift lever 20 are engaged.

Referring back to FIG. 7, the engaging portion 71*b* of the shift coupler 71 is loosely engaged with the annular groove 67*b* formed in the boss 67*a* of the intermediate gear 67, allowing the rotation of the boss 67. The axial movement of the engaging portion 71 is limited by a retaining ring 69 mounted on the boss 67*a*.

As the shift lever 20 is turned, the overrunning clutch and the intermediate gear 67 are moved axially through the shift coupler 71.

Figure 11:
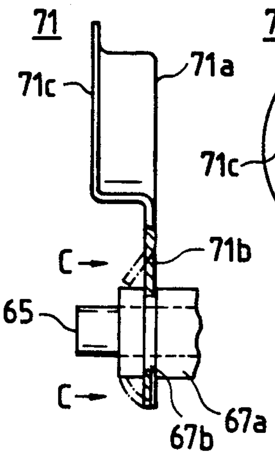
FIG. 11 is a front view for a description of a method of engaging a shift coupler with an annular groove formed in the boss of an intermediate gear in a fourth embodiment of the invention.

FIG. 11 is a front view, with essential portions in section, showing a shift coupler in a fourth embodiment. The inner peripheral portion of the engaging portion 71*b* of the shift coupler 71 are bent axially as indicated by the chain lines, thus increasing its diameter. The engaging portion 71*b* thus processed is mounted on the boss 67*b* of the boss 67*a* of the intermediate gear 67 in such a manner that it is positioned near the annular groove 67. Under this condition, the inner peripheral portion bent as described above is pushed in the direction of the arrow C with a proper tool until it is loosely fitted in the annular groove 67*b*.

Thus, the engaging portion 71*b* of the shift coupler 71 permits the rotation of the boss 67, and its axial movement is limited. In this case, it is unnecessary to use a retaining ring to limit the axial movement of the engaging portion 71*b*.

Figure 12:
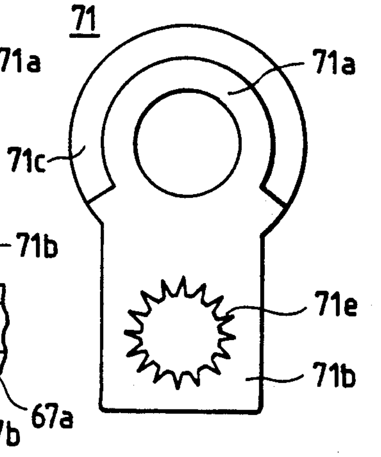
FIG. 12 is a side view showing a shift coupler in a fifth embodiment of the invention.

FIG. 12 is a side view of a shift coupler in a fifth embodiment of the invention. A number of slits 71*e* are formed in the inner peripheral portion of the engaging portion 71*b* of the shift coupler 71. As the engaging portion 71*b* is mounted on the boss 67*a* of the intermediate gear 67 by pushing it, the inner peripheral portion having the slits 71*e* is bent, and upon arrival to the annular groove 67*b* (cf. FIG. 11) it is restored flat, so that it is loosely engaged with the annular groove 67*b*. In this case also, the boss 69*a* can rotate freely, and the axial movement of the engaging portion is limited by the annular groove.

Thus, the engaging portion is engaged with the intermediate gear in the direction of axis with no retaining ring.

Figure 13:
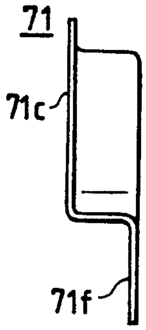
FIGS. 13 and 14 are a front view and a side view, respectively, showing a shift coupler in a sixth embodiment of the invention.
Figure 14:
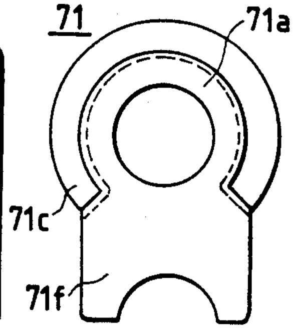

FIGS. 13 and 14 are a front view and a side view, respectively, showing a shift coupler in a sixth embodiment of the invention. The engaging portion 71*f* of the shift coupler 71 is so designed in length that it is engaged with a half of the annular groove 67*b* formed in the boss 67*a* of the intermediate gear 67. In this case also, the engaging portion is engaged with the intermediate gear in the direction of axis with no retaining ring.

Figure 15:
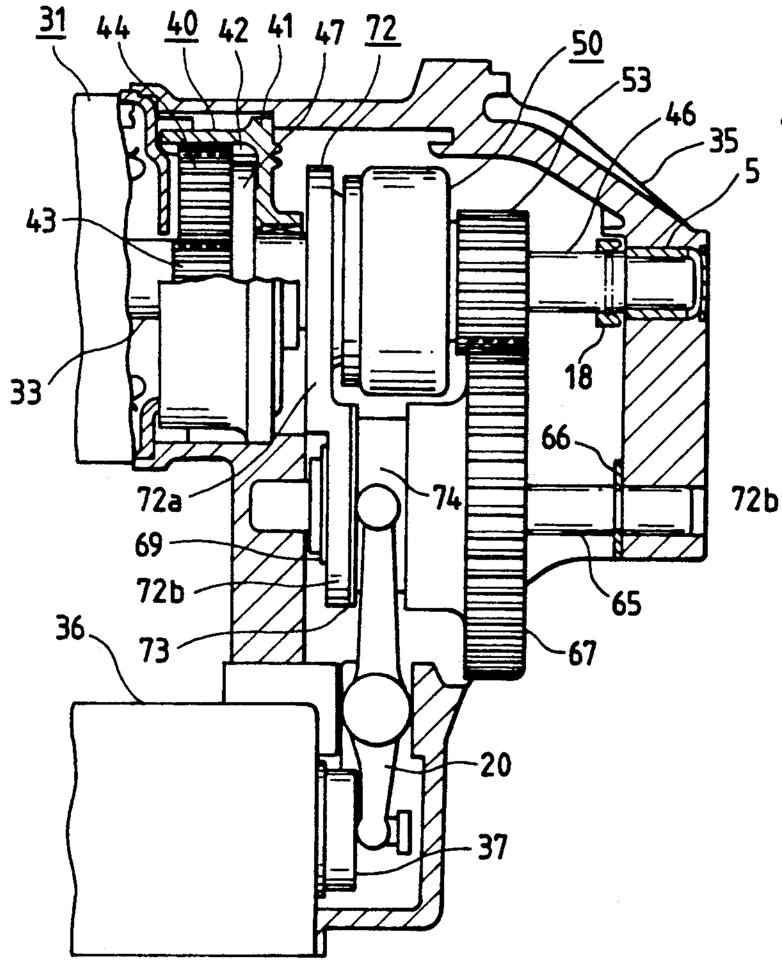
FIG. 15 is a front view, with parts cut away, showing essential components of an intermediate gear type starter motor which constitutes a seventh embodiment of the invention.
Figure 16:
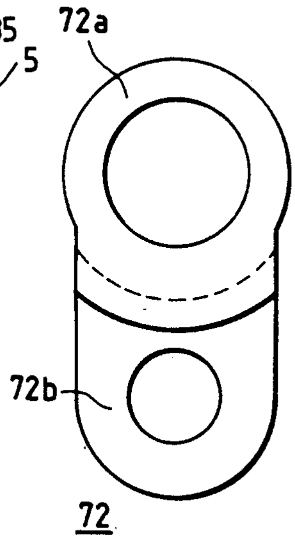
FIG. 16 is a side view of a shift coupler shown in FIG. 15.

FIG. 15 is a sectional view showing essential components of an intermediate gear type starter motor which constitutes a seventh embodiment of the invention. In the embodiment, its shift coupler 71 is formed by molding a synthetic resin material high in mechanical strength, comprising an annular portion 72*a*, and an engaging portion 72*b* extended radially of the annular portion 72*a*. Similarly as in the case of FIG. 4, the annular portion 72*a* is loosely mounted on the rear end portion of the clutch outer 51, allowing the rotation of the latter 51, and the axial movement of the annular portion 72*a* is limited by a retaining ring 55 mounted on the rear end portion of the clutch outer 51. FIG. 16 is a side view of the shift coupler 72.

Referring back to FIG. 15, reference numeral 73 designates a stiffening plate which is mounted on the boss 67*a* of the intermediate gear, and abuts against the inner end face of the engaging portion 72*b* of the shift coupler 72. The stiffening plate 73 and the step of the boss 67*a* define an engaging groove 74.

The electromagnetic switch 36 is mounted on the front bracket 35 on the side of the intermediate gear 67. The plunger 37 of the electromagnetic switch 36 is coupled to one end portion of a shift lever 20, the two prongs of the other end portion of which are engaged with the engaging groove 74 of the boss 67*a*.

As the shift lever 20 is turned, the intermediate gear 67 is moved axially, and the overrunning clutch 50 is moved in the same direction through the shift coupler 72.

Figure 17:
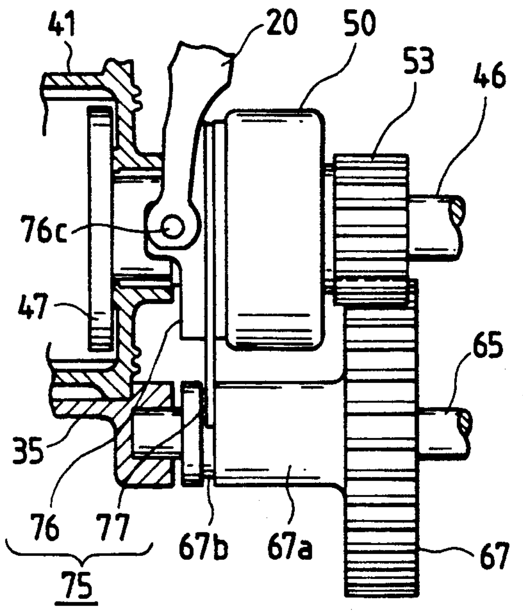
FIG. 17 is a front view, with part cut away, showing essential components in a part of an intermediate gear type starter motor which constitutes an eighth embodiment of the invention.
Figure 18:
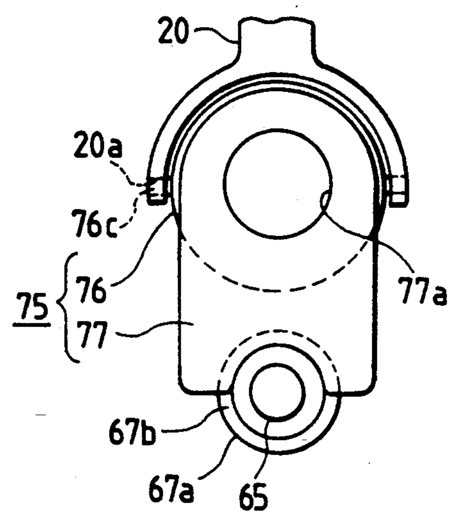
FIG. 18 is a side view of a shift coupler shown in FIG. 17.

FIG. 17 is a front view, with parts in section, showing essential components of an intermediate gear type starter motor which constitutes an eighth embodiment of the invention. In FIG. 17, reference numeral 75 designates a shift coupler which comprises an annular member 76, and an engaging member 77. The annular member 76 is made of a synthetic resin material high in mechanical strength, and similarly as in the case of FIG. 4, it is loosely mounted on the rear end portion of the clutch outer 51, and its axial movement is limited by a retaining ring 55 mounted on the rear end portion of the clutch outer. As shown in FIG. 18, the annular member 76 has a pair of protrusions 76*c*, which are engaged with two engaging holes 20*a* formed in the end portions of the two prongs of the shift lever 20, respectively. The engaging member 77 is made of a metal plate, and has a mounting hole 77*a* with which the engaging member 77 is loosely mounted on the rear end portion of the clutch outer 51. The axial movement of the engaging member 77 is limited by the step of the clutch outer 51 and the annular member 76. The end portion of the engaging member 77 is loosely engaged with a half of the annular groove 67*b* formed in the boss 67*a* of the intermediate gear 67, allowing the rotation of the boss 67*a*, and being limited in axial movement.

The shift coupler 75, comprising the annular member 76 and the engaging member 77, is simple in construction, and accordingly it can be mounted with ease.

Figure 19:
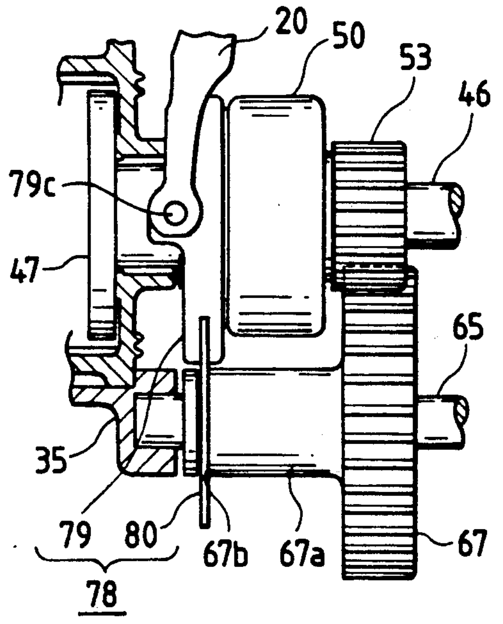
FIG. 19 is a front view, with parts cut away, showing essential components in a part of an intermediate gear type starter motor which constitutes a ninth embodiment of the invention.
Figure 20:
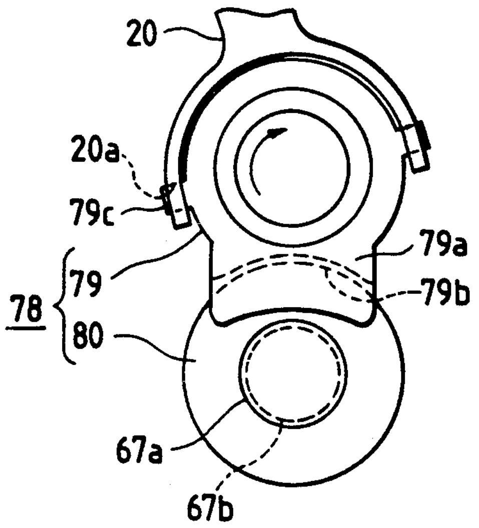
FIG. 20 is a side view of a shift coupler shown in FIG. 19.

FIG. 19 is a front view, with parts in section, showing essential components of an intermediate gear type starter motor which constitutes a ninth embodiment of the invention. FIG. 20 is a side view of a shift coupler in the ninth embodiment. The shift coupler 78 comprises an annular member 79 of a synthetic resin high in mechanical strength, and an engaging member 80 made of a metal plate. Similarly as in the case of FIG. 4, the annular member 79 is loosely mounted on the rear end portion of the clutch outer 51, and its axial movement is limited by a retaining ring 55. The annular member 79 has a pair of protrusions 79*c*, which are engaged with engaging holes 20*a* formed in the end portions of the two prongs of the shift lever 20. A coupling portion 79*a* is extended radially of the annular member 79, and has an arcuate engaging groove which is coaxial with the boss 67*a* of the intermediate gear. The engaging member 80 is in the form of a disk. The engaging member 80 is engaged with the annual groove 67*b* of the boss 67*a*, so that its axial movement is limited, while the outer peripheral portion of the engaging member 80 is loosely engaged with the engaging groove, thus providing a sufficiently large engaging area.

The engaging member 80 is engaged with the engaging groove 67*b* with no retaining ring in the same manner as in the case of FIG. 11.

In each of the above-described embodiments, the planetary gear type speed reducer 40 is included. However, it should be noted that the technical concept of the invention is applicable to an intermediate gear type starter motor in which, similarly as in the prior art, the armature rotary shaft is extended to the front end of the front bracket with the planetary gear type speed reducer omitted.

Furthermore, in the above-described embodiments, the shift couplers 68 and 70, and the annular members 76 and 79 are made of synthetic resin; however, they may be made of metal materials high in mechanical strength and small in frictional coefficient.

Figure 21:
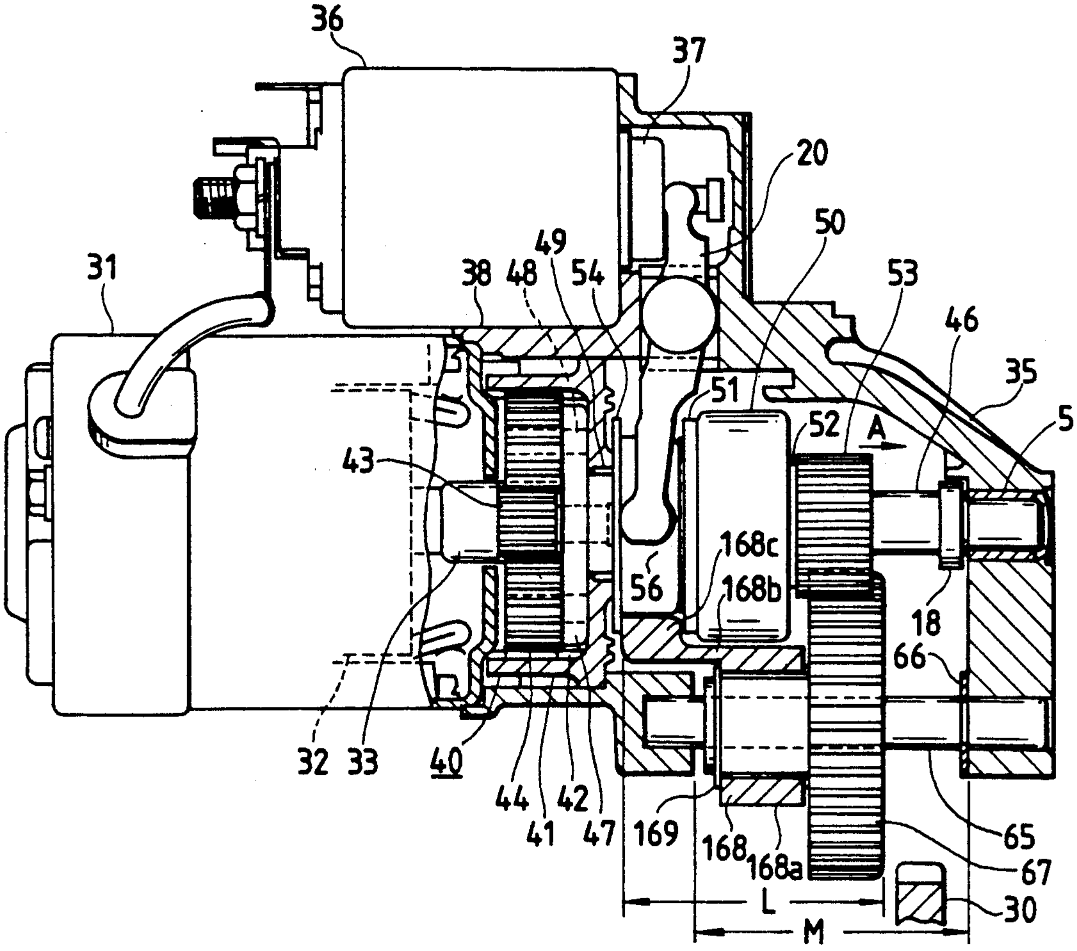
FIG. 21 is a front view, with part cut away, showing essential components of a part of an intermediate gear type starter motor according to this invention.
Figure 22:
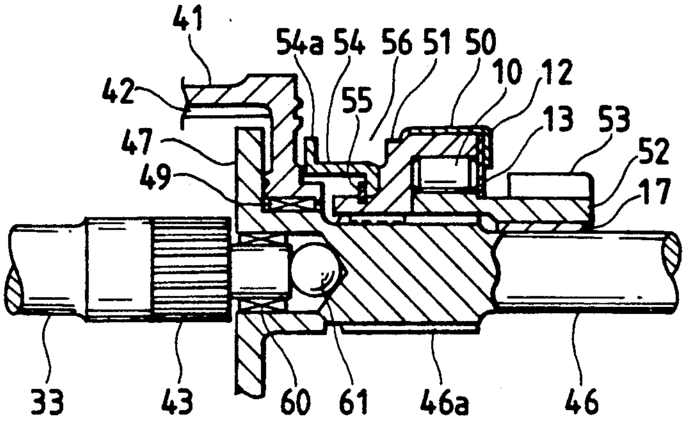
FIG. 22 is a sectional view of an overrunning clutch shown in FIG. 21.

FIG. 21 is a front view, partly as a sectional view, showing essential components of an intermediate type starter motor which constitutes a tenth embodiment of this invention.

Reference numeral 54 designates an engaging ring which is mounted on the clutch outer 51 and secured with a retaining ring 55. The engaging ring 54 has an engaging ring portion 54*a* which defines an engaging groove 56 with the step of the clutch outer 51. The lower end portions of the two prongs of the shift lever 20 are engaged with the engaging groove 56 thus defined.

The clutch outer thus designed is used for a starter motor which has no intermediate gear; however, it can be used for an intermediate gear type starter motor according to the invention as it is.

Reference numeral 168 designates a shift coupler which is loosely mounted on the boss of the intermediate gear 67 and is held in place with a retaining ring 169. The shift coupler 168 is made up of a boss 168*a*, and an arm 168*b* extended axially from the boss 168*a*. The arm 168*b* has an arcuate engaging portion 168*c* at the end. The shift coupler 168 is made of a synthetic resin material high in mechanical strength; however, it may be formed by using a metal material as the case may be.

Figure 23:
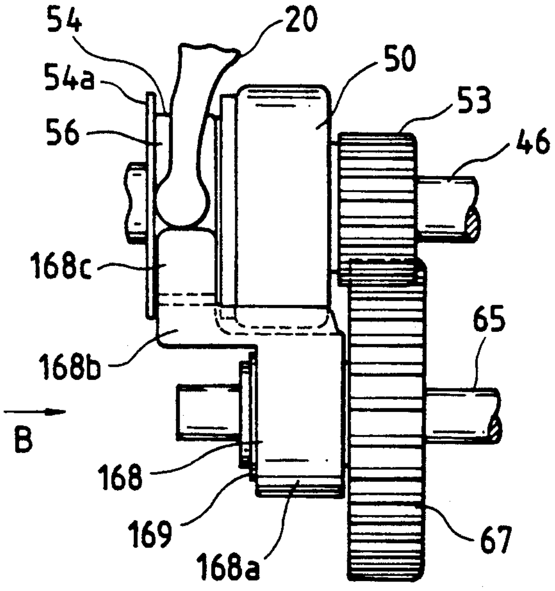
FIG. 23 is a front view of a shift coupler shown in FIG. 21.
Figure 24:
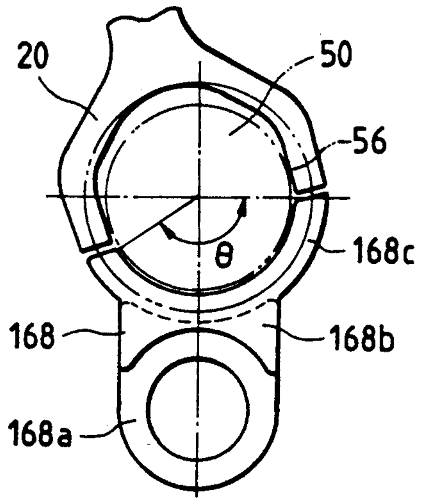
FIG. 24 is a side view of the shift coupler as viewed in the direction of the arrow B in FIG. 23.

FIG. 23 is a front view of the shift coupler 168, and FIG. 24 is a side view of the shift coupler as viewed in the direction of the arrow B in FIG. 23. The arcuate engaging portion 168*c* of the shift coupler 168 is inserted into the engaging groove 56 of the overrunning clutch 56 from below, thus confronting with the ends of the two prongs of the shift lever. In this case, the angle of engagement ($\theta$) of the arcuate engaging portion is less than 180 degrees so that the arcuate engaging portion can be readily inserted into the engaging groove 56 from below.

The assembly of the intermediate gear 67 and the shift coupler 168 has an axial length L, which is smaller than the length M of the opening of the front bracket 35. When the overrunning clutch 50 is moved forwardly, the engaging groove 56 appears in the opening. Therefore, under this condition, the assembly is inserted into the front bracket through the opening, so that the arcuate engaging portion of the shift coupler 168 is engaged with the engaging groove 56. That is, the assembly can be built in the starter motor in the final step of the assembling work with ease.

The boss 168*a* of the shift coupler 168 is mounted on the boss of the intermediate gear 67. Therefore, when the shift lever 20 is turned, the overrunning clutch 50 is moved axially, whereby the intermediate gear 168 is moved through the shift coupler 168. In this operation, no moment is applied to the intermediate gear 67, and accordingly the latter 67 is smoothly moved.

When the electromagnetic switch 36 is energized, the shift lever 20 is turned counterclockwise, so that the overrunning clutch 50 is moved forwardly, and therefore the intermediate gear 67 is moved forwardly through the shift coupler 168; that is, the intermediate gear 57 is engaged with the ring gear 30 of the engine. At the same time, the stationary contact means of the electromagnetic switch is closed to energize the circuit of the starter motor 31 thereby to rotate the armature 32. The rotation of the armature 32 is transmitted to the relay shaft 46 with the speed reduced by the planetary gear type speed reducer 40, so that the ring gear 30 is rotated through the overrunning clutch 50 and the intermediate gear 67, thus starting the internal combustion engine.

In the above-described tenth embodiment of the present invention, the intermediate gear type starter motor includes the planetary gear type speed reducer: however, the technical concept of the invention is applicable to an intermediate gear type starter motor in which, as in the conventional intermediate gear type starter motor, the armature rotary shaft is extended to the front end of the front bracket with no planetary gear type speed reducer.

EFFECTS OF THE INVENTION

As was described above, in the starter motor according to the first aspect of the present invention, the shift coupler is interposed between the rear end portion of the clutch outer of the overrunning clutch and the boss of the intermediate gear, so that as the shift lever is turned, the overrunning clutch and the intermediate gear are axially moved in an interlock mode. The annular portion of the shift coupler is loosely mounted on the rear end portion of the clutch outer so that the shift coupler is axially coupled to the overrunning clutch, and the engaging portion extended radially of the annular portion is loosely engaged with the whole or half of the outer periphery of the boss or of the annular groove with the axial movement limited. Therefore, the smooth axial movement of the intermediate gear can be achieved, and the wear of the engaging portion of the shift coupler with the intermediate gear is minimized, whereby the service life is increased, and accordingly the reliability is improved.

In the starter motor according to the second aspect of the present invention, the shift coupler is formed by stamping a metal plate; that is, it can be manufactured with ease. In engaging the engaging portion with the annular groove formed in the boss of the intermediate gear, the engaging portion is increased in inside diameter by deforming its inner peripheral portion, and the engaging portion thus treated is engaged with the annular groove by restoring the inside diameter. Therefore, the axial movement of the engaging portion can be limited without use of a retaining ring.

In the intermediate gear type starter motor according to the third aspect of the present invention, the shift coupler consists of the annular member and the engaging member which are provided separately. The engaging member is fitted between the annular member mounted on the rear end portion of the clutch outer and the step of the latter, and the engaging portion extended from the engaging member is radially inserted into the annular groove formed in the boss of the intermediate gear in such a manner that its axial movement is limited. Hence, the shift coupler is simple in construction, and can be readily installed without use of a retaining ring etc.

In the intermediate gear type starter motor according to the fourth aspect of the present invention, the shift coupler comprises the annular member and the engaging member which are provided separately. The annular member is mounted on the rear end portion of the clutch outer with the axial movement limited. The engaging groove is formed in the coupling portion extended from the annular member, and the disk-shaped engaging member is mounted on the boss of the intermediate gear in such a manner that the outer peripheral portion of the engaging member is engaged with the engaging groove. Hence, the construction is simple, and the installation can be achieved with ease.

As was describe above, in the intermediate gear type starter motor of the fifth aspect of the present invention, the boss of the shift coupler is loosely mounted on the boss of the intermediate gear with its axial movement limited, the arm is extended axially from the boss of the shift coupler, the upper end portion of the arm is formed into the arcuate engaging portion, and the arcuate engaging portion thus formed is inserted into the engaging groove of the overrunning clutch from below with the axial movement limited. Hence, a conventional ordinary overrunning clutch can be employed as it is, and yet the axial movement of the intermediate gear can be achieved smoothly. In addition, the intermediate gear assembly can be built in the start motor in the final step of the starter motor assembling work.

What is claimed is:

1. An intermediate gear type starter motor comprising an electric motor (1) having an armature rotary shaft (3), an overrunning clutch (7) to which rotation of said rotary shaft (3) is transmitted directly or through speed reducing means (47), said overrunning clutch (7) rotating a pinion (53) in one way which is provided at the front end of said overrunning clutch (7), and being moved axially by a shaft lever (20) which is operated by an electromagnetic switch (36), and an intermediate gear (67) which is rotatably and axially movably mounted on a supporting shaft (65) arranged in parallel with an axis of said rotary shaft, said intermediate gear (67) being in engagement with said pinion **(53*d*) and being moved forwardly to engage with a ring gear (30)** of an internal combustion engine, characterized by further including:

a shift coupling means (68, 71, 72, 75, 168) interposed between a clutch outer of said overrunning clutch and a boss of said intermediate gear to achieve an axial movement of said overrunning clutch and said intermediate gear in an interlock mode, said shift coupling means comprising;

a first engaging member **(68*a*, 71*a*, 71*c*, 72*a*, 76, 78, 79, 168*c*) loosely mounted on a rear end portion of the clutch outer of said overrunning clutch in such a manner that the axial movement of said overrunning clutch is limited, and a second engaging member (68*a*, 71*b*, 71*f*, 72*b*, 77, 79*a*, 79*b*, 80, 168*a*)** extended radially of said first engaging member, said second engaging member being engaged with the boss of said intermediate gear at least a part of an outer periphery of said second engaging member and limited in axial movement, and in which, when a swing of said shift lever is transmitted axially to one of said first engaging member and the boss of said intermediate gear, said overrunning clutch and said intermediate gear are moved axially by said shift coupling means.

2. An intermediate gear type starter motor as claimed in claim 1, in which said shift coupling means is formed by stamping a metal material.

3. An intermediate gear type starter motor as claimed in claim in which said shift coupling means is formed by molding a synthetic resin material high in mechanical strength.

4. An intermediate gear type starter motor as claimed in claim 1, in which said first engaging member has engaging portions **(68*c*, 76*c*, 79*c*) through which said first engaging member is engaged with the end portions of two prongs (20***a*) of said shift lever so that a force of movement is applied thereto.

5. An intermediate gear type starter motor as claimed in claim 1, in which said second engaging member (71*b*, 71*f*, 76) includes an engaging portion (71*f*) extended radially which is engaged with at least a half of an annular groove (67*b*) formed in an outer cylindrical surface of the boss of said intermediate gear in such a manner that said second engaging member is limited in axial movement.

6. An intermediate gear type starter motor as claimed in claim 1, in which said second engaging member comprises;

a first engaging portion (79*a*) extended radially of said first engaging member, said first engaging portion having an arcuate engaging groove (79*b*) coaxial with said intermediate gear, and a second engaging portion (80) engaged with the boss of said intermediate gear at least a part of an outer periphery of said second engaging portion and limited in axial movement, said second engaging portion being shaped in a form of a disk in such a manner that the outer peripheral portion of said second engaging portion is engaged with said arcuate engaging groove of said first engaging portion.

7. An intermediate gear type starter motor as claimed in claim 1, further comprising a front bracket (5) coupled to a front end portion of said electric motor (1), in which said intermediate gear and said shift coupling means are smaller in axial length than a lower opening of said front bracket.

8. An intermediate gear type starter motor as claimed in claim 1, in which each of said first engaging member and said second engaging member is ring-shaped.

9. An intermediate gear type starter motor as claimed in claim 1, in which said first engaging member is ring-shaped and said second engaging member is U-shaped.

10. An intermediate gear type starter motor as claimed in claim 1, in which said first engaging member is U-shaped and said second engaging member is ring-shaped.

* * * * *